United States Patent [19]
Arai et al.

[11] Patent Number: 5,601,513
[45] Date of Patent: Feb. 11, 1997

[54] SYSTEM FOR DETECTING SHIFTER POSITION SENSOR MALFUNCTION

[75] Inventors: Takashi Arai; Atsushi Abe; Koichi Funatsu; Tadashi Yamatani, all of Wako, Japan

[73] Assignee: Honda Giken Kogyo Kabushiki Kaisha, Tokyo, Japan

[21] Appl. No.: 548,624

[22] Filed: Oct. 26, 1995

[30] Foreign Application Priority Data

Oct. 31, 1994 [JP] Japan ................................... 6-290633

[51] Int. Cl.$^6$ ........................... F16H 61/12; F16H 59/10
[52] U.S. Cl. ........................... 477/115; 477/97; 477/906; 371/62
[58] Field of Search ............................ 477/97, 115, 906; 371/62, 68.1

[56] References Cited

U.S. PATENT DOCUMENTS 4,335,359  10/1982  Kanegae et al. .................. 371/62 X
5,178,042   1/1993  Moroto et al. .................... 477/121 X

FOREIGN PATENT DOCUMENTS 63-57948  3/1988  Japan ................................... 477/906
63-72952  4/1988  Japan ................................... 477/906
 3-61760  3/1991  Japan ................................... 477/906
 5-231529 9/1993  Japan ................................... 477/906
 6-66367  3/1994  Japan ................................... 477/906

*Primary Examiner*—Khoi Q. Ta

[57] ABSTRACT

A system for detecting malfunction of a transmission of a vehicle, more particularly a system for detecting a failure of a shift lever position sensor for a vehicle automatic transmission is provided with two detection modes based on urban driving and open-road driving. The number of times that the vehicle speed goes up and down between prescribed upper and lower values separately defined for the two modes is counted, when the shift lever position signal is absent. Probable failure is judged when the number of times reaches eight in the first mode and sensor failure is confirmed when the number of times reaches three in the second mode. Shift lever position sensor failure can be reliably detected irrespective of whether the driving environment is urban or open-road.

9 Claims, 3 Drawing Sheets

5,601,513

SYSTEM FOR DETECTING SHIFTER POSITION SENSOR MALFUNCTION

BACKGROUND OF THE INVENTION

1. Field of the Invention

This invention relates to a system for detecting malfunction of a transmission of a vehicle, more particularly a system for detecting failure of a shift lever position sensor that detects the shift lever position of an automatic transmission of a vehicle.

2. Description of the Prior Art

In the case of an automatic transmission shift lever having the positions P, R, N, D4, D3, 2, (1), for example, the shift lever position sensor has a fixed contact for each position and the lever has a movable contact that makes contact with the fixed contact at the position where the lever is set, causing an electric signal of a first level to be output. Positions other than the one at which the lever is set output electric signals of a second level. The position to which the shift lever is shifted can therefore be detected from the fact that only one of the plurality of positions outputs a first-level signal while the other positions output second-level signals.

With this arrangement, failure of the sensor may cause simultaneous detection of two positions or failure to detect even one position.

The object of this invention is therefore to deal with the latter case by providing a system for detecting malfunction of a transmission of a vehicle, more particularly a system for detecting failure of a shift lever position sensor for a vehicle automatic transmission, which can reliably detect failure of the shift lever position sensor to detect even one position.

SUMMARY OF THE INVENTION

This invention achieves this object by providing a system for detecting malfunction of a transmission of a vehicle, comprising, vehicle speed detecting means for detecting a traveling speed of the vehicle, a shift lever installed in the vehicle for allowing a driver to select one of a plurality of positions each corresponding to gear ranges in the transmission, shift lever position detecting means for detecting a position selected by the driver to output a signal indicative of the position, counting means for counting, when the signal is absent, the number of times that the detected vehicle speed exceeds a prescribed speed in a period starting when an ignition switch is turned on and ending when the ignition switch is turned off, and determining means for determining that said shift lever position detecting means fails when the count reaches a prescribed number.

BRIEF EXPLANATION OF THE DRAWINGS

This and other objects and advantages of the invention will be more apparent from the following description and drawings, in which.

DETAILED DESCRIPTION OF THE PREFERRED EMBODIMENTS

An embodiment of the invention will now be explained with reference to the attached drawings.

Figure 1:
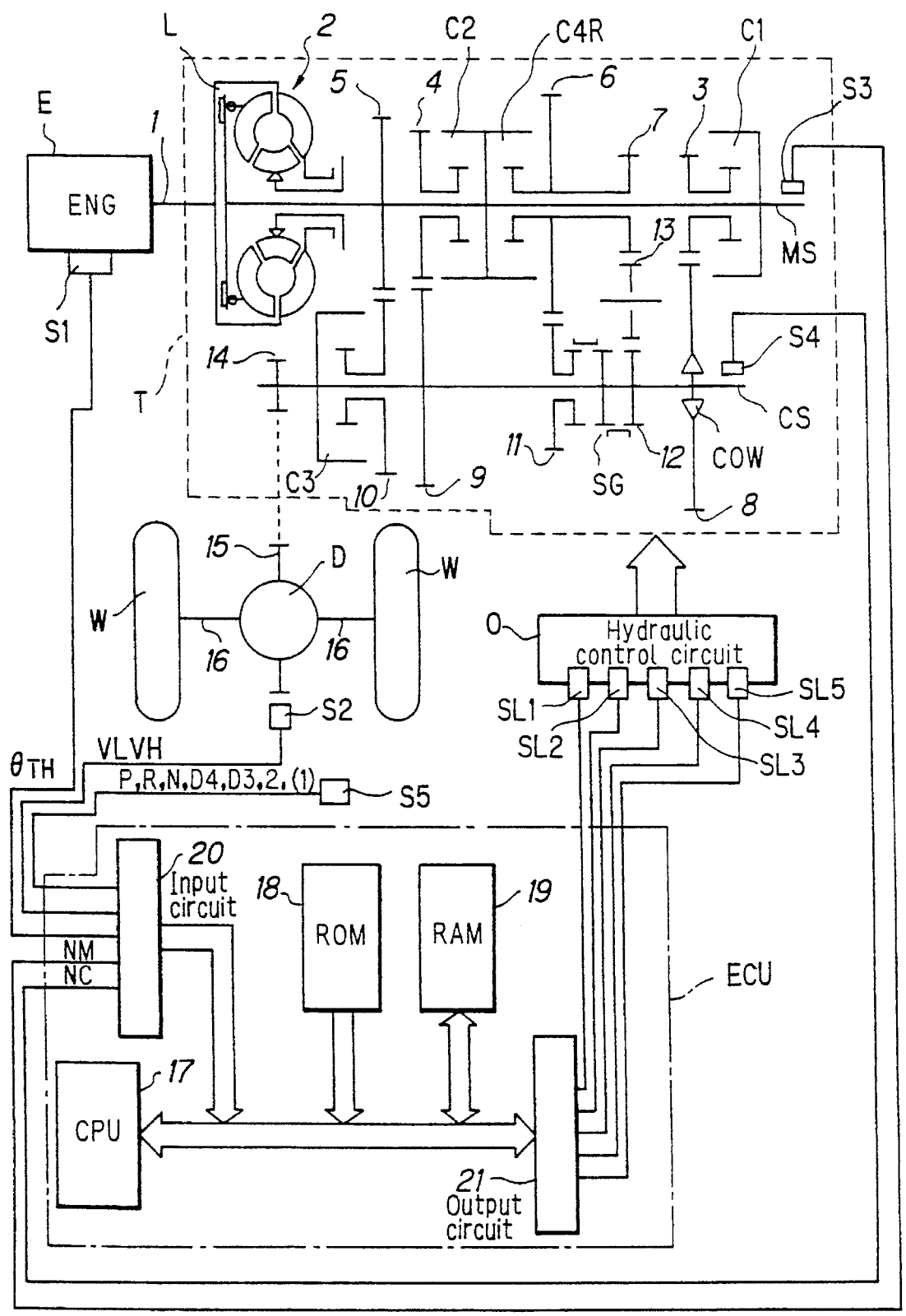
FIG. 1 is an overall schematic view of the system for detecting malfunction of a transmission of a vehicle according to the present invention.

FIG. 1 is an overall view of the system for detecting malfunction of a transmission of a vehicle, more particularly the system for detecting failure of a shift lever position sensor for a vehicle automatic transmission according to the invention.

As shown in FIG. 1, a vehicle automatic transmission T is equipped with a main shaft MS connected with a crankshaft 1 of an internal combustion engine E through a torque converter 2 having a lockup clutch L and with a countershaft CS connected with the main shaft MS through multiple gear trains.

The main shaft MS supports a main first-speed gear 3, a main second-speed gear 4, a main third-speed gear 5, a main fourth-speed gear 6 and a main reverse gear 7. The countershaft CS supports a counter first-speed gear 8 engaged with the main first-speed gear 3, a counter second-speed gear 9 engaged with the main second-speed gear 4, a counter third-speed gear 10 engaged with the main third-speed gear 5, a counter fourth-speed gear 11 engaged with the main fourth-speed gear 6 and a counter reverse gear 12 engaged with the main reverse gear 7 through a reverse idle gear 13.

The first gear is established when the main first-speed gear 3 rotatably supported on the main shaft MS is connected with the main shaft MS by a first-speed hydraulic clutch C1. Since the first-speed hydraulic clutch C1 is also maintained in the engaged state during establishment of the second-fourth gears, the counter first-speed gear 8 is supported by a one-way clutch COW. The second gear is established when the main second-speed gear 4 rotatably supported on the main shaft MS is connected with the main shaft MS by a second-speed hydraulic clutch C2. The third gear is established when the counter third-speed gear 10 rotatably supported on the countershaft CS is connected with the countershaft CS by a third-speed hydraulic clutch C3.

The fourth gear is established when the counter fourth-speed gear 11 rotatably supported on the countershaft CS is connected with the countershaft CS by a selector gear SG and with this state maintained the main fourth-speed gear 6 rotatably supported on the main shaft MS is connected with the main shaft MS by a fourth-speed reverse hydraulic clutch C4R. The reverse gear is established when the counter reverse gear 12 rotatably supported on the countershaft CS is connected with the countershaft CS by the selector gear SG and with this state maintained the main reverse gear 7 rotatably supported on the main shaft MS is connected with the main shaft MS by the fourth-speed reverse hydraulic clutch C4R.

The rotation of the countershaft CS is transmitted through a final drive gear 14 and a final driven gear 15 to a differential D, from where it is transmitted to driven wheels W, W through left and right drive shafts 16, 16.

A throttle position sensor S1 is provided in an air intake pipe (not shown) of the engine E at a point in the vicinity of a throttle valve (not shown) for detecting the degree of opening or position THHF of the throttle valve. A vehicle speed sensor S2 for detecting the vehicle traveling speed VLVH from the rotational speed of the final driven gear 15 is provided in the vicinity of the final driven gear 15. A transmission input shaft speed sensor S3 is provided in the vicinity of the main shaft MS for detecting the rotational speed NM of the transmission input shaft from the rotation of the main shaft MS, and a transmission output shaft speed sensor S4 is provided in the vicinity of the countershaft CS for detecting the rotational speed Nc of the transmission output shaft from the rotation of the countershaft CS.

A shift lever position sensor S5 is provided in the vicinity of a shift lever (not shown) installed on the vehicle floor near the driver's seat that allows the driver to select one of seven positions P, R, N, D4, D3, 2, (1) each corresponding to the gear ranges mentioned above in the well-known manner. The shift lever position sensor S5 detects which of the seven positions has been selected by the driver. Outputs of the sensors S1, etc., are sent to an ECU (electronic control unit).

The ECU is constituted as a microcomputer comprising a CPU (central processing unit) 17, a ROM (read-only memory) 18, a RAM (random access memory) 19, an input circuit 20 and an output circuit 21. The outputs of the sensors S1, etc., are input to the microcomputer through the input circuit 20. The CPU 17 of the microcomputer determines the gear (ratio) and energizes/deenergizes shift solenoids SL1, SL2 of a hydraulic control circuit O via the output circuit 21 so as to switch shift valves (not shown) and thereby engage/disengage the hydraulic clutches of prescribed gears. As will be explained later, it also detects shift lever position sensor failure.

Symbols SL3 and SL4 designate an ON/OFF control solenoid and a capacity control solenoid for the lockup clutch L of the torque converter 2. Symbol SL5 designates a linear solenoid for controlling clutch oil pressure.

Figure 2:
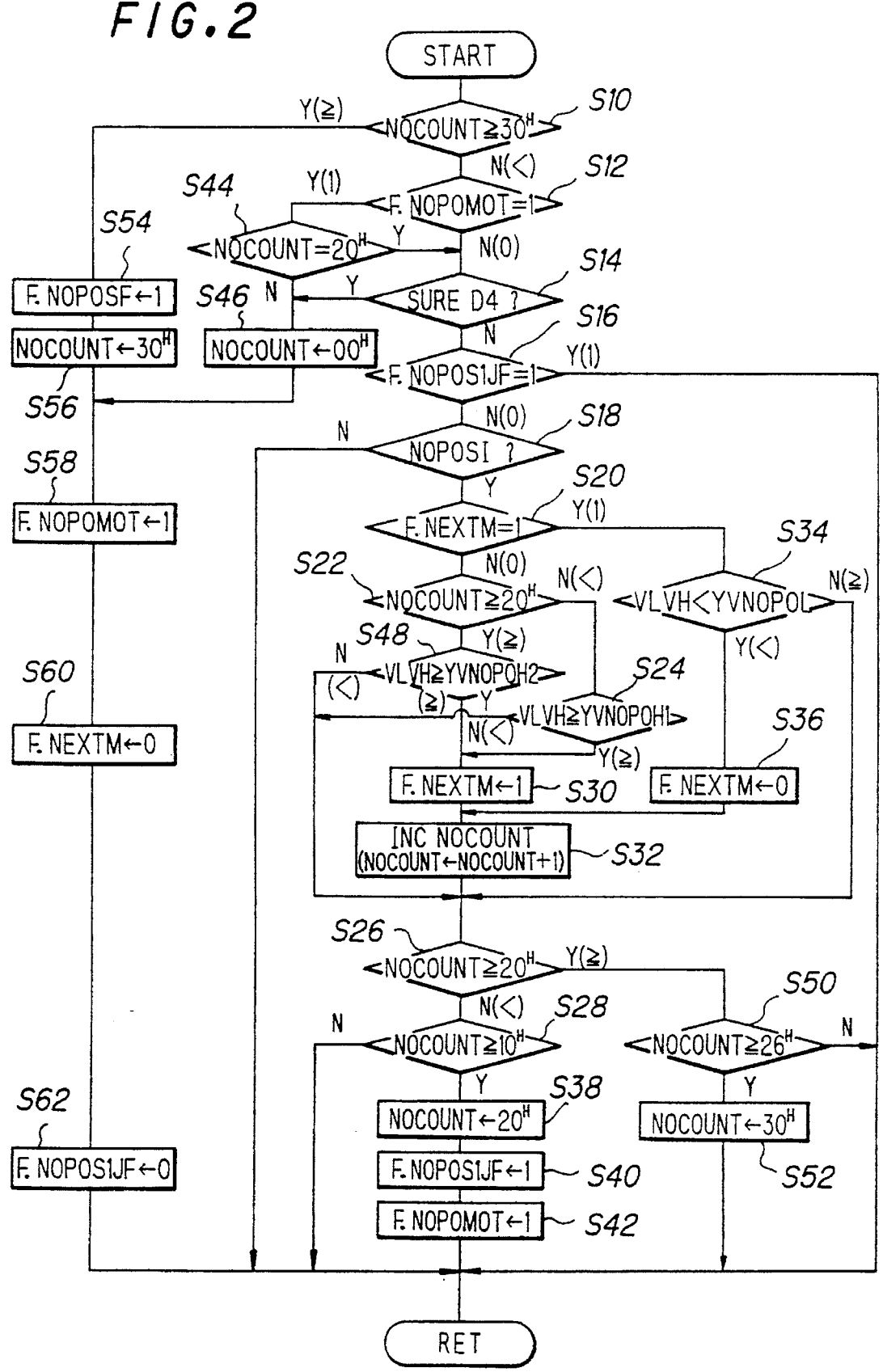
FIG. 2 is a flowchart showing the operations of the system of FIG. 1.

FIG. 2 is a flowchart showing the operation of the system of FIG. 1. The explanation of this figure will, however, be preceded by a general explanation with reference to the timing chart of FIG. 3.

The system is provided with two detection modes, e.g., an urban detection mode (left side of FIG. 3) and an open-road detection mode (right side). Upon entering the first mode (urban detection mode) after the ignition is turned on, the system counts the number of times that the vehicle speed goes above and below prescribed upper and lower vehicle speeds. When the count reaches a first prescribed number, the system makes a "probable failure" judgment, meaning that the probability of sensor failure is high.

Next, when the ignition has been turned off and then on again, the system enters the second mode (open-road detection mode) in which it similarly counts the number of times that the vehicle speed goes above and below another set of prescribed upper and lower vehicle speeds. When the count reaches a second prescribed number, the system confirms that the sensor has actually failed. (When the system receives even a single D4 or other drive position signal between ignition turn-on and failure confirmation, it cancels the value (counted number of times) up to that time.)

More specifically, in the urban detection mode (left side of FIG. 3) vehicle speed VLVH is compared with a prescribed first upper value YVNOPOH1 (e.g., 40 km/h) and a prescribed lower value YVNOPOL (e.g., 10 km/h). Every time the vehicle speed VLVH reaches or exceeds the prescribed upper value, the value of a counter NOCOUNT (failure discrimination counter) is incremented and the bit of a flag F.NEXTM (vehicle speed discrimination flag) is set to 1. Similarly, every time the vehicle speed VLVH goes below the prescribed lower value, the value of the counter NOCOUNT is incremented and the bit of the flag F.NEXTM is reset to 0.

Figure 3:
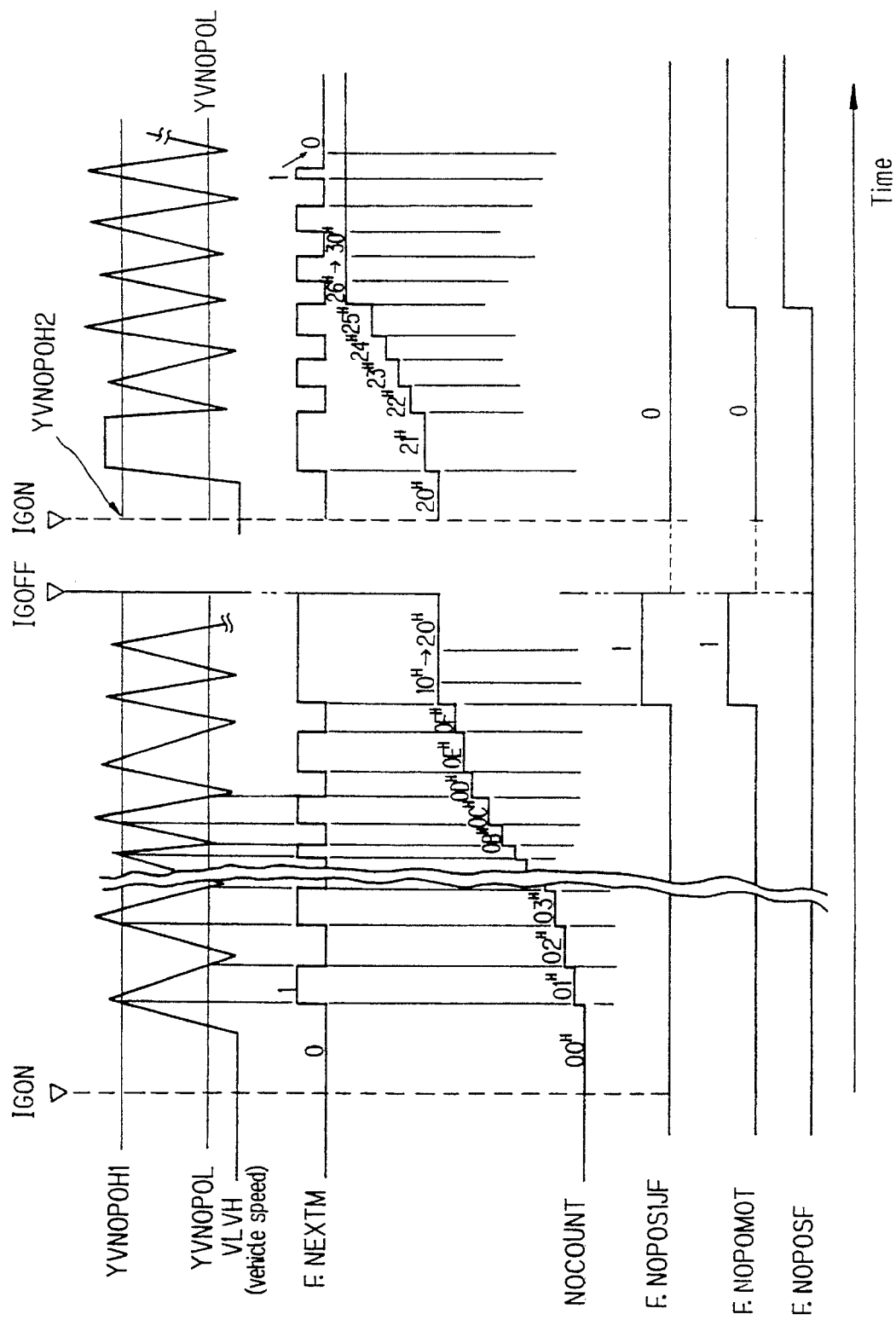
FIG. 3 is a timing chart for explaining the operations in the flowchart of FIG. 2.

When the value of the counter NOCOUNT reaches a first prescribed number such as 10H (16 in the decimal system), meaning that the vehicle speed has gone back and forth between the prescribed values 8 times, the bit of a flag F.NOPOS1JF (probable failure judgment flag) is set to 1 and, at the same time, the bit of a flag F.NOPOMOT is also set to 1 (indicating that the trip in the detection mode on the left side of FIG. 3 has been completed). Also at the same time, the value of the counter NOCOUNT is rewritten to 20H. (A "trip" is defined as a vehicle driving event between the times that the ignition is turned on and off.)

When the ignition is next turned on, the system enters the open-road detection mode on the right side of FIG. 3. In this mode, the vehicle speed VLVH is compared with a prescribed second upper value YVNOPOH2 (e.g., 50 or 60 km/h) and the prescribed lower value YVNOPOL (same as that in the urban detection mode), and processing similar to that in the urban detection mode is conducted.

When the value of the failure discrimination counter NOCOUNT reaches a second prescribed number (starting from the initial value of 20H) such as 26H, meaning that the vehicle speed has gone back and forth between the prescribed values 3 times, the bit of a flag F.NOPOSF (confirmed failure flag) is set to 1, confirming sensor failure (indicating a judgment that the sensor has actually failed). At the same time, the bit of the flag F.NOPOMOT, which was cleared at the time the ignition was turned on, is also set to 1 as an indication that the trip in the detection mode on the right side of FIG. 3 has been completed. This terminates the operation.

The flowchart of FIG. 2 will now be explained. (The program starts in one of the detection modes of FIG. 3 immediately after the ignition has been turned on and is activated once every 20 ms thereafter.)

In FIG. 2, the program starts at S10 in which it is checked whether the value of the failure discrimination counter NOCOUNT is 30H (decimal 16) or greater. As explained later, the value of this counter is rewritten to 30H upon confirmation of sensor failure. S10 therefore amounts to determining whether sensor failure has already been confirmed.

The result in S10 is naturally NO in the first program loop (control cycle) and the program goes to S12 in which it is checked whether the bit of flag F.NOPOMOT is 1. This amounts to determining whether a trip in the urban detection mode (left side in FIG. 3) has been completed.

The result in S12 is also naturally NO in the first program loop and the program goes to S14 in which it is checked whether the D4 position signal is being received. As was touched on briefly in the foregoing, the failure detection is suspended when one of the following circumstances arises:
1. The D4 position signal is received even once after the ignition is turned on;
2. The D4 position signal is received after a probable failure judgment;
3. When the D4 position signal is not received during two consecutive trips (when probable failure judged in the urban detection mode (left side of FIG. 3) is confirmed in the open-road detection mode (right side) and it is decided that the sensor actually failed).

When the result is NO in S14, the program proceeds to S16 in which it is checked whether the bit of the flag F.NOPOS1JF (probable failure judgment flag) is 1. This amounts to checking whether probable failure has been judged.

The result in S16 is naturally NO in the first program loop and the program goes to S18 in which it is checked whether no output signal is being produced by the shift lever position sensor (this situation being designated NOPOSI). When the result in S18 is YES, the program goes to S20 in which it is checked whether the bit of a flag F.NEXTM (vehicle speed change discrimination flag) is 1. This amounts to checking whether the vehicle speed VLVH is equal to or greater than the prescribed first upper value (speed) YVNOPOH1 or below the prescribed lower value (speed) YVNOPOL.

The result in S20 is NO in the first program loop and the program goes to S22 in which it is checked whether the value of the failure discrimination counter NOCOUNT is 20H or greater. The result is of course NO in the first program loop and the program goes to S24 in which it is checked whether vehicle speed VLVH is equal to or greater than the prescribed first upper value YVNOPOH1.

As pointed out earlier, the first program loop is executed in the urban detection mode (left side of FIG. 3) immediately after the ignition is turned on. The result in S24 is therefore NO and the program moves to S26 in which it is again checked whether the value of the failure discrimination counter NOCOUNT is 20H or greater. The result is NO and the program goes to S28 in which it is checked whether the value of the failure discrimination counter NOCOUNT is10H or greater. The result is NO and the program terminates.

Beginning from the next program loop (control cycle), when S24 finds that the vehicle speed VLVH is equal to or greater than the prescribed first upper value YVNOPOH1, the bit of the flag F.NEXTM (vehicle speed change discrimination flag) is set to 1 in S30 and the program goes to S32 in which the value of the failure discrimination counter NOCOUNT is incremented, whereafter the program terminates following negative judgments in S26 and S28.

In the next program loop, since S20 finds that the bit of the flag F.NEXTM (vehicle speed change discrimination flag) is set to 1, the program goes to S34 in which it is checked whether the vehicle speed VLVH is below the prescribed lower value YVNOPOL. When it is not, the program terminates following negative judgments in S26 and S28.

Beginning from the next program loop, when S34 finds that the vehicle speed VLVH is below the prescribed lower value YVNOPOL, the program goes to S36 in which the bit of the flag F.NEXTM (vehicle speed change discrimination flag) is reset to 0 and to S32 in which the value of the failure discrimination counter NOCOUNT is incremented, whereafter the program terminates following negative judgments in S26 and 28.

So long as no change arises in results in S10 to S18, the operations just described are repeated in each successive program loop until S28 finds that the value of the failure discrimination counter NOCOUNT is 10H or larger (that the vehicle speed has gone up and down between the prescribed values 8 times or more), in which case the program goes to S38 in which the value of the failure discrimination counter NOCOUNT is rewritten to 20H, to S40 in which the bit of the flag F.NOPOS1JF (probable failure judgment flag) is set to 1 as an indication of probable failure, and to S42 in which the bit of flag F.NOPOMOT is set to 1 as an indication that the trip in the urban detection mode on the left side of FIG. 3 has been completed.

In each loop thereafter, the program proceeds from S12 to S44 until the result in S44 becomes YES, at which time it goes to S14. When the result in S14 is NO, the program goes to S16 and when the result in S16 is YES, the program terminates.

When the result in S14 is YES, i.e., when it is found that the D4 position signal was received, the program goes to S46 in which the value of the failure discrimination counter NOCOUNT is reset to 0. In other words, as mentioned earlier, failure detection is suspended when it is found that the D4 position signal was received, because receipt of the D4 position signal is proof that the sensor has not failed. The same also applies before probable failure is judged.

When the bit of the flag F.NOPOS1JF is 1 at the time the ignition is thereafter turned off, the value 20H of the failure discrimination counter NOCOUNT is stored in a backup section of the RAM 19. The bit values of the flags F.NOPOS1JF and F.NOPOMOT are not backed up but are reset to 0 when the ignition is next turned on.

Next, consider the case where the open-road detection mode (right side of FIG. 3) is implemented immediately after the ignition is turned on.

In FIG. 2, the program starts at S10, in which the result is NO, to S12, in which the result is also NO, and to S14. When the result in S14 is NO, the program goes to S16. Since the bit of the bit of the flag F.NOPOS1JF was reset to 0 when the ignition was turned on, the result in S16 is NO and the program proceeds to S18, in which the result is YES, and to S20.

Immediately after ignition turn-on, the result in S20 is NO, so the program proceeds to S22, in which the result in YES, and to S48 in which it is checked whether the detected vehicle speed VLVH is equal to or greater than the prescribed second upper value YVNOPOH2 in the open-road detection mode. When it is, the program passes through S26 and the following steps and the program terminates.

Beginning from the next program loop, when S48 finds that the detected vehicle speed VLVH is equal to or greater than the prescribed second upper value YVNOPOH2, the program goes to S30 in which the bit of the flag F.NEXTM (vehicle speed change discrimination flag) is set to 1, to S32 in which the value of the failure discrimination counter NOCOUNT is incremented, and to S26 in which it is checked whether the value the counter NOCOUNT is equal to or greater than 20H.

In the urban detection mode (left side of FIG. 3), the value of the counter NOCOUNT is rewritten to 20H at the time probable failure is judged and this value is backed up when the ignition is turned off. Since the result in S26 is therefore YES, the program goes to S50 in which it is checked whether the value of the failure discrimination counter NOCOUNT is equal to or greater than 26H. The result is NO and the program terminates.

Beginning from the next program loop, the result in S20 is YES and the program goes to S34 in which it is checked whether the detected vehicle speed VLVH is below the prescribed lower value YVNOPOL. If it is not, the program proceeds through S26 and the following steps in which the same procedures are repeated. When the result is YES, the program goes to S36 in which the bit of the flag F.NEXTM (vehicle speed change discrimination flag) is reset to 0, to S32 in which the value of the failure discrimination counter NOCOUNT is incremented, and to S26 and the following steps in which the same procedures are repeated.

When after a number of program loops S50 finds that the value of the failure discrimination counter NOCOUNT is equal to or greater than 26H, the program goes to S52 in which the value of the failure discrimination counter NOCOUNT is rewritten to 30H, indicating that sensor failure has been confirmed.

Beginning from the next program loop, therefore, the result in S10 is YES and the program proceeds to S54 in which the bit of the flag F.NOPOSF (confirmed failure flag) is set to 1, to S56 in which the value of the failure discrimination counter NOCOUNT is rewritten to 30H, to S58 in which the bit of the flag F.NOPOMOT is set to 1, to S60 in which the bit of the flag F.NEXTM is reset to 0, and to S62 in which the bit of the flag F.NOPOS1JF is reset to 0, whereafter the program terminates.

In the embodiment described in the foregoing, probable failure (high probability of sensor failure) is judged when the criteria for failure judgment are met during a trip in the urban detection mode (left side of FIG. 3). Once probable failure has been judged, when the judgment criteria shown for the open-road detection mode (right side) are then met in a trip in this mode, a confirmed failure judgment is made. In other words, it is judged that the sensor has actually failed. As a result, it is possible to detect failure of the shift lever position sensor accurately and reliably.

Moreover, since two different detection modes are established, shift lever position sensor failure can be detected with improved accuracy. By switching between lower and higher prescribed upper values selected based on urban and open road driving conditions, it becomes possible to detect shift lever position sensor failure with high accuracy irrespective of whether the actual driving environment is urban or open-road.

Moreover, since the value for a trip is canceled when the D4 position signal is received after ignition turn-or after probable failure judgment, or when it is not received during two consecutive trips, the reliability of shift lever position sensor failure detection is even further enhanced.

The two detection modes shown on the left and right sides of FIG. 3 are only examples and various modifications are possible. For instance, while the foregoing embodiment defines the prescribed upper values such that

YVNOPOH1<YVNOPOH2, it is instead possible to define

YVNOPOH1>YVNOPOH2 or

YVNOPOH1=YVNOPOH2.

In addition, while the foregoing embodiment uses the same prescribed value YVNOPOL in both modes, it is also possible to use different values.

Furthermore, it is alternatively possible to use only one of the two detection modes to detect the failure, although the failure detection accuracy degrades to a fair extent.

In the foregoing embodiment, the value of the counter NOCOUNT indicating the number of times that the vehicle speed goes back and forth between the prescribed upper and lower values is compared with different reference numbers in the two detection modes, namely, with 8 in the urban detection mode and with 3 in the open-road detection mode. This is not limitative, however, and it is instead possible to use the same reference number in both modes or to use a larger reference number in the open-road detection mode than in the urban detection mode.

While the invention was described with reference to application to a hydraulically operated transmission, it can also be applied to other types of automatic transmissions.

While the invention has thus been shown and described with reference to the specific embodiments, it should be noted that the invention is in no way limited to the details of the described arrangements, changes and modifications may be made without departing from the scope of the appended claims.

What is claimed is:

1. A system for detecting malfunction of a transmission of a vehicle, comprising:

vehicle speed detecting means for detecting a traveling speed of the vehicle;

a shift lever installed in the vehicle for allowing a driver to select one of a plurality of positions each corresponding to gear ranges in the transmission;

shift lever position detecting means for detecting a position selected by the driver to output a signal indicative of the position;

counting means for counting, when the signal is absent, the number of times that the detected vehicle speed exceeds a prescribed speed in a period starting when an ignition switch is turned on and ending when the ignition switch is turned off; and determining means for determining that said shift lever position detecting means fails when the count reaches a prescribed number.

2. A system according to claim 1, wherein the prescribed speed has an upper value and a lower value, and said counting means counts the number of times each time the detected vehicle speed goes above the upper value and below the lower value.

3. A system for detecting malfunction of a transmission of a vehicle, comprising:

vehicle speed detecting means for detecting a traveling speed of the vehicle;

a shift lever installed in the vehicle for allowing a driver to select one of a plurality of positions each corresponding to gear ranges in the transmission;

shift lever position detecting means for detecting a position selected by the driver to output a signal indicative of the position;

first counting means for counting, when the signal is absent, the number of times that the detected vehicle speed exceeds a first prescribed speed in a first period starting when an ignition switch is turned on and ending when the ignition switch is turned off;

first determining means for determining whether the first count reaches a first prescribed number;

second counting means for counting, when the signal is still absent, the number of times that the detected vehicle speed exceeds a second prescribed speed in a second period starting when an ignition switch is again turned on after the first count reached the first prescribed number and the ignition switch was once turned off and ending when the ignition switch is turned off; and second determining means for determining that said shift lever position detecting means fails when the second count reaches a second prescribed number.

4. A system according to claim 3, wherein the second prescribed speed is greater than the first prescribed speed.

5. A system according to claim 3, wherein the second prescribed number is less than the first prescribed number.

6. A system according to claim 4, wherein the second prescribed number is lesser than the first prescribed number.

7. A system according to claim 3, wherein the first prescribed speed has a first upper value and a first lower value, and said counting means counts the number of times each time the detected vehicle speed goes above the first upper value and below the first lower value.

8. A system according to claim 3, wherein the second prescribed speed has a second upper value and a second lower value, and said counting means counts the number of times each time the detected vehicle speed goes above the second upper value and below the second lower value.

9. A system according to claim 8, wherein first prescribed speed has a first upper value and a first lower value and the second upper value is greater than the first upper value.

* * * * *